United States Patent [19]

Fujishima et al.

[11] 4,406,813

[45] Sep. 27, 1983

[54] DISOXIDANT AND PROCESS FOR PREPARING SAME

[76] Inventors: Daishiro Fujishima; Shinichiro Fujishima, both of 18-12, Asahi-machi, Sagamihara-shi, Kanagawa-ken, Japan

[21] Appl. No.: 373,491

[22] PCT Filed: Aug. 21, 1980

[86] PCT No.: PCT/JP80/00191
§ 371 Date: Apr. 20, 1982
§ 102(e) Date: Apr. 20, 1982

[87] PCT Pub. No.: WO82/00599
PCT Pub. Date: Mar. 4, 1982

[51] Int. Cl.$^3$ .................. B01J 20/02; C09K 15/02
[52] U.S. Cl. ........................ 252/188.28; 210/750; 422/19; 423/219; 426/262; 426/541
[58] Field of Search .............. 252/188.28; 210/750; 422/19; 423/219; 426/262, 545

[56] References Cited

U.S. PATENT DOCUMENTS

| | | | |
|---|---|---|---|
| 4,192,773 | 3/1980 | Yoshikawa et al. | 252/188.28 |
| 4,230,595 | 10/1980 | Yamaji et al. | 252/188.28 |
| 4,299,719 | 11/1981 | Aoki et al. | 252/188.28 |
| 4,317,742 | 3/1982 | Yamaji et al. | 252/188.28 |

*Primary Examiner*—Irwin Gluck
*Attorney, Agent, or Firm*—Stephen F. K. Yee

[57] ABSTRACT

A process for preparing a disoxidant, comprising: providing fine powder of a porous filler f-1, such as zeolite, having a particle size not greater than 100 mesh and coarse powder of a porous filler f-2, such as zeolite, having a particle size greater than 100 mesh; adding water to the coarse powder f-2 such that the total water content for the sum of the fine and coarse powder f-1 and f-2 is 20–90% of the amount of saturated water absorption thereof; mixing 20–60% by volume of the fine powder f-1 with 80–40% by volume of the coarse powder f-2; and admixing the resulting mixture F with fine metallic powder M, such as iron, having disoxidation activity and a particle size not greater than 100 mesh, with a volume ratio M/F of the component M to F being in the range of $\frac{1}{2}$ to 1/10. Disclosed also is a disoxidant obtained by the above process.

8 Claims, No Drawings

DISOXIDANT AND PROCESS FOR PREPARING SAME

TECHNICAL FIELD

This invention relates to a disoxidant having an enhanced reaction activity (disoxidation activity) with atmospheric oxygen, and a process for preparing same.

BACKGROUND ART

It has been known in the art that fine metallic powder reacts with atmospheric oxygen in the presence of water, and this principle can be found in various disoxidants which have thus far been proposed and used widely for the purpose of food preservation. For example, Japanese Laid-Open Patent Application No. 52-104486 proposes a disoxidant consisting of a mixture of a metal and a filler, Japanese Laid-Open Patent Application No. 52-104489 proposes a disoxidant consisting of a metal, water, a halogenated metal and a filler, and Japanese Laid-Open Patent Application No. 53-14185 proposes a disoxidant consisting of metal powder coated with a halogenated metal.

In this connection, there are two methods available for industrially producing a disoxidant which contains fine metal powder as a major component with disoxidation activity. The first method is to prepare a master batch by mixing the respective components beforehand, charging and sealing a predetermined amount of the master batch in packaging bags by the use of a charging machine. The second method is to charge successively predetermined amounts of the ingredients in the packaging bag by a charging machine. The first method has an advantage that the respective components can be mixed by means of a mixing machine like a kneader or an internal mixer to attain a relatively good mixing effect to permit production of a disoxidant with high reactivity. However, there unavoidably arises a problem that the fine metallic powder which has a far greater specific gravity as compared with other components so that it is extremely difficult to obtain a perfectly uniform mixture by mixing it with other ingredients, resulting in irregularities in the amounts of the fine metallic powder charged in individual packaging bags. Since the oxygen absorption capacity of the disoxidant is determined by the content of the fine metallic powder, it will invite irregularities in the disoxidation capacity of the ultimate products. Besides, the first method requires to conduct the operations in an inert gas atmosphere to prohibit inducement of disoxidation reaction in the course of preparation of the master batch.

On the other hand, the second method is free of the problem concerning the irregularities in the oxygen absorption capacity since predetermined amounts of the respective components are securely charged in the individual packaging bags. In this instance, however, it is difficult to mix the respective components unformly, and a portion mainly consisting of the metal powder and a portion mainly consisting of a filler material separately exist in the packaging bags. Upon reaction in the presence of water, the metallic powder tends to aggregate into blocks which are extremely hinderous to smooth progress of the disoxidation reaction. In this regard, Japanese Laid-Open Patent Application No. 54-35189 discloses a method of successively charging metal powder and a hydrous substance into packaging paper without contacting them with each other prior to the charging stage. Nevertheless, even this method fails to attain the uniform mixing of the metal powder and hydrous substance. Namely, according to this method, the hydrous substance is preferred to be in a granular form having a particle size as large as 0.5-10 mm, which conspicuously differs from that of the metal powder and thus it is impossible to form a uniform mixture with the metal powder. The major portion of the metal powder remains separate from the granules in most portions so that there cannot be obtained a disoxidant with enhanced reactivity.

DISCLOSURE OF THE INVENTION

According to the present invention, there is provided a process for producing a disoxidant, comprising: providing fine powder of porous filler f-1 having a particle size smaller than 100 mesh and coarse powder of porous filler f-2 having a particle size greater than 100 mesh; adding water to the coarse powder of porous filler f-2 in a controlled amount so that the total water content for the sum of the fine powder f-1 and coarse powder f-2 is 20-90% of the amount of saturated water absorption of the fine and coarse powder; mixing 20-60% by volume of the fine powder f-1 with 80-40% by volume of the coarse powder f-2; and admixing to the resulting mixture F fine metal powder M having a particle size smaller than 100 mesh with a volume ratio of the component M to F in the range of $\frac{1}{2}$-1/10.

According to another aspect of the present invention, there is provided a disoxidant in the form of a mixture of a disoxidant component M and a disoxidation control component F consisting of 20-60% by volume of fine powder of porous filler having a particle size smaller than 100 mesh and 80-40% by volume of coarse powder of porous filler having a particle size a particle size greater than 100 mesh and having a total water content controlled in the range of 20-90% based on the amount of saturated water absorption, the ratio M/F of the disoxidant component M to the disoxidation control component F being in the range of $\frac{1}{2}$-1/10.

The fine metallic powder M (hereinafter referred to as "metal powder" or "metal component" for brevity) means a fine powdery substance containing a metal or metal ion capable of bonding to molecular oxygen, which includes, for example, fine powder of metals, alloys or metal compounds of iron, copper, manganese, zinc, aluminum, nickel, chromium, ferrosilicon, ferronickel, ferromanganese, iron carbide, iron sulfide, ferrous oxide, ferrous hydroxide and the like. Among these, iron powder is most advantageous from the economical point of view. These metals are used singly or in the form of a mixture. The major proportion (more than 60 wt%, preferably more than 90 wt%) of the metal component M has a particle size not greater than 100 mesh (Tyler's mesh), preferably in the range of 120-130 mesh. Further, the metal component M can be prepared by various methods and may be, for instance, reduced powder, electrolytic powder, spray powder or pulverized powder.

According to the present invention, the metal component M may be used after a surface activation treatment. The surface activation can be attained by contacting the fine metal powder for reaction with an aqueous acid solution of a concentration of 0.001-10 wt%, normally of 0.05-5 wt%. In this instance, room temperature is sufficient for the reaction although heat may be applied if desired. The water-decomposing power (the easiness of producing hydrogen) of the surface-activated metal powder by contact with moisture shows a tendency of becoming higher when treated with an aqueous acid solution of a higher concentration in the surface activating treatment. Therefore, in order to obtain a disoxidant with suppressed water-decomposing power, the acid concentration should be limited to a certain range, and in normal cases the acid concentration of the aqueous acid solution to be used in the surface activating treatment should be less than 1%.

The aqueous acid solution can employ inorganic acids such as chloric acid, sulfuric acid nitric acid and phosphoric acid, and various organic acids including carboxylic acids such as formic acid, acetic acid and oxalic acid and organic sulfonic acids, or compounds which exhibit acidity by hydrolysis including ammonium salts such as ammonium chloride, ammonium nitrate and ammonium sulfate, and salts of a weak acid and a weakly basic group including metal salts like iron chloride. The pH of the aqueous acid solution is lower than 5, and normally in the range of 5-1.

In order to contact the fine metal powder with the acidic aqueous solution for reaction, a suitable amount of the acidic aqueous solution is added to the fine metal powder and mixed therewith if necessary. In this instance, the amount of the additive aqueous solution is 5-50 parts by weight and more specifically 10-30 parts by weight for 100 parts by weight of the metal powder. Of course, the additive amount of the acidic aqueous solution may be increased, for example, to 100-200 parts by weight or more. In such a case, excess water should be removed after the treatment. However, in view of the problem of the treatment of waste water after the reaction of the metal powder and the acidic aqueous solution, it is undesirable to use an extremely large amount of the aqueous solution, and it is preferred that it is in the range of 5-50 parts by weight against 100 parts by weight of iron as mentioned hereinbefore or it is controlled such that the reaction of the treatment results in a neutral product.

The fine metal powder which has undergone the surface activation in this manner is then subjected to a drying treatment to remove moisture from its surfaces by evaporation. For the drying treatment, it is advantageous to employ the vacuum-drying method which permits quick moisture removal but it may be effected in an inert gas flow. Of course, there may be employed other methods such as a centrifugal dehydration drying method or a heating method. In such a case, the drying temperature is about 40°-120° C. The surface-activated dry fine metal powder has a higher disoxidation activity as compared with non-activated metal powder.

Further, according to the present invention, the metal component M may be formed with an oxidation layer on its surfaces prior to use. The metal powder with an oxidation layer on its surfaces shows suppressed water-decomposing power and enhanced disoxidation activity. In order to form such an oxidation layer, the metal powder is put in reaction with molecular oxygen in the presence of water. Water suffices to be added in an amount suitable for wetting the surfaces of the metal powder, and addition of an exessive amount of water is undesirable since it will impede the contact of metal surfaces with molecular oxygen, lowering the reaction velocity. Generally, water is added in an amount of about 2-50 parts by weight, normally 5-20 parts by weight against 100 parts by weight of the metal powder. The oxidation reaction proceeds at room temperature but heat may be applied to conduct the reaction at temperatures of 50°-90° C. for the purpose of increasing the reaction velocity. Under heating condition which encourages evaporation of moisture, there may arise a problem that the reaction is delayed due to lack of water. In such a case, the oxidation reaction can be accelerated by re-adding a suitable amount of water.

Although there may be used metal powder without the surface activation treatment for the oxidation reaction treatment at the sacrifice of the reaction velocity, it is advantageous to employ metal powder which has been treated for the surface activation as described hereinbefore. Consequently, in order to produce metal powder with oxidation layers in an advantageous manner, it is recommended to subject the metal powder to the surface activation treatment in the first stage and to the oxidation treatment in the second stage.

The metal powder resulting from the oxidation reaction treatment has an oxidation layer on its surface according to the degree of oxidation, so that its disoxidation activity and water-decomposing power vary depending on the degree of oxidation of the oxidation layer, and a higher degree of oxidation is reflected by higher disoxidation activity and more suppressed water-decomposing power. For instance, in the case of an oxidation treatment of iron powder, the color of the metal powder surface turns gradually from black to dark brown depending upon the degree of oxidation, and there is observed a tendency that the powder of dark brown is greater in disoxidation activity and more suppressed in water-decomposing power as compared with black powder. It may also be mentioned that, as the activated metal powder, there may be employed metal powder which is coated with a halogenated metal as described in Japanese Laid-Open Patent Application No. 54-35883.

Examples of the porous components f-1 and f-2 which consitute the disoxidation reaction control component F according to the present invention include, in addition to clayish materials such as zeolite, sepiolite, ochre, kaolin, diatomaceous earth, tarc, bentonite, pearlite and clay, activated carbon, light burned magnesia, silica, alumina, silica gel and the like. The fine powder f-1 of porous filler to be used in the present invention should have a major portion (more than 60% by weight, preferably more than 90% by weight) of a particle size not greater than 100 mesh, preferably in the range of 120-350 mesh. The particle size of the fine porous filler powder f-1 is actually preferred to be about the same as the fine metallic powder M. The coarse porous filler powder f-2 should have a major portion (greater than 60% by weight, preferably greater than 90% by weight) of a particle size greater than 100 mesh, preferably in the range of 50-10 mesh. Of course, a particle size of 2-5 mm or greater can be applied in some cases. However, it is undesirable in view of the inferior mixing and dispersing properties of the fine metallic powder in the fine porous filler powder.

In order to produce a disoxidant according to the present invention, the process comprises providing the above-mentioned fine porous filler powder f-1 and coarse porous filler powder f-2, adding to the coarse filler powder water in an amount as required for the reaction of the dioxidant, and mixing the fine and coarse porous filler powder f-1 and f-2 to form a disoxidation reaction control component F. In this instance, the fine powder component f-1 and coarse powder component f-2 may be formed either from the same material or from different materials. For example, it is possible to use zeolite for the fine powder component f-1 and activated carbon for the coarse powder component f-2 or vice versa.

The additive amount of water to the coarse powder component f-2 is controlled in such a range that the total water content in the mixture F of the fine and coarse powder components f-1 and f-2 is 20-90%, preferably 30-60% of the amount of saturated water absorption of the mixture F. An increase in the total water content in the mixture F will invite a deterioration in fluidity of the mixture, resulting in low compatibility with the charging machine. Besides, if the water content approaches the amount of saturated water absorption, the powder surfaces become wet and individual particles tend to stick to each other, wetting the surfaces of the metal powder when sealed in a packaging bag together with the latter, consequently impairing the disoxidation activity of the metal powder to a considerable degree. On the other hand, if the water content is too small, it becomes difficult to secure the moisture necessary for the disoxidation reaction, inviting a material deterioration in the reactivity of the metal powder with atmospheric oxygen. In view of these circumstances, the total water content in the mixture F should be in the range of 20-90%, preferably in the range of 30-60% based on the amount of saturated water absorption, in consideration of the compatibility with the charging machine and the catalytic action of the metal powder in the disoxidation reaction. Generally, in a case where zeolite, kaolin or similar clayish substance (with a saturated water absorption of about 50% by weight) is used for the fine powder component f-1 and coarse powder component, the total water content in the mixture F is recommended to be 10-40% by weight, preferably 15-30% by weight based on the weight of the mixture. The water content is also related with the water-decomposing power of the disoxidant and should be limited as much as possible, for instance, to smaller than 60%, more preferably to 30-50% of the saturated water absorption capacity of the total mixture F in order to obtain a disoxidant which has distinctively suppressed water-decomposing power.

Further, in the present invention, it is necessary to add water to the coarse powder component f-2 of the porous filler material since addition to the fine powder component f-1 is impractical. More particularly, if water is added directly to the fine powder f-1, the fine particles which are contacted with water tend to aggregate and form coarse particles with low mixing and dispersing quality, impairing the advantage of the fine powder.

With regard to the proportions of the mixing fine and coarse powder components f-1 and f-2, the fine powder component f-1 is added in an amount of 20-60% by volume, preferably 30-50% by volume, while the coarse powder component is added in an amount of 80-40% by volume, preferably 70-50% by volume. If the content of the fine powder component f-1 in the mixture F is increased, it will become possible to obtain more intimate mixing with the fine metal powder for production of a disoxidant of high reactivity. On the other hand, if it is contained excessively, the fluidity of the mixture F will be lowered as compared with that of the coarse powder component f-2, resulting in impaired compatibility with the charging machine and poor properties in measurability in the charging stage as well as in drop-chargeability into packaging bags by the charging machine. For example, the fine powder particles with more than 15% water content show binding property and tend to stick on the walls of the charging and measuring containers. In consideration of the fluidity (compatibility with the machine) of the mixture F and the reactivity of the ultimate disoxidant, the proportion of the fine powder component f-1 should be retained in the range of 20-60% by volume, preferably in the range of 30-50% by volume.

In the present invention, it is possible to mix the fine and coarse powder components f-1 and f-2 in the charging stage, but it is preferred to prepare the mixture of the two powder beforehand and keep it in a air-tight bag of plastic film or the like or in a closed space for a predetermined time period to transfer a substantial portion of the water content in the coarse powder component f-2 to the fine powder component f-1. More particularly, when the mixture of the coarse powder component f-2 with a high water content and the fine powder component f-1 with a low water content is placed in a closed space, moisture in the coarse powder component f-2 evaporates due to the large difference in water content of the two powder and adsorbed by the relatively dry fine powder component f-1 until the water contents in the respective powder reach a certain equilibrium value which is determined depending upon temperature conditions. If the fine powder component is moistened by the shift of water content in this manner, there occurs no difficulties such as aggregation of fine particles or formation of blocks as experienced when water is added directly to the fine powder component. In addition, the fine powder which contains 10-30% by weight of water is free of the dust-scattering trouble in the charging stage. In a case where the mixture is charged immediately after mixing the fine and coarse powder components, the shift of moisture content takes place in the packaging bags.

When adding water to the coarse powder component f-2 according to the present invention, it is advantageous to dissolve an electrolyte in water to let the coarse powder component f-2 carry the electrolyte along with water. The addition of an electrolyte makes it possible to obtain a disoxidant with an extremely high disoxidation activity. Examples of the electrolyte to be added include halides of alkali metals such as NaCl, KCl, NaBr and KBr, halides of alkali earth metals such as $MaCl_2$, $CaCl_2$, $CaBr_2$, $MgBr_2$ and $BaBr_2$, various metal halides such as $AgCl_2$, $ZnCl_2$, $AlCl_3$, $SnCl_2$, $MnCl_2$, $FeCl_3$, $CoCl_2$, $NiCl_2$, $CuCl_2$, $ZnBr_2$, $SNBr_2$, $CuBr$ and $FeBr_2$, various sulfate such as $Na_2SO_4$, $K_2SO_4$, $CaSO_4$, $MgSO_4$, $Al_2(SO_4)_3$, $NiSO_4$ and $FeSO_4$, and various ammonium salts such as $NH_4Cl$, $NH_4Br$, $(NH_4)_2SO_4$ or the like. Any way, a metal salt or an ammonium salt is arbitrarily used as an electrolyte which is considered to contribute to accelerate the oxidation of the metal component by forming local cells upon contact therewith. The additive amount of the electrolyte has no restrictions in particular but normally a small amount in the range of 0.01-50 g, preferably in the range of 0.5-5 g is sufficient.

The coarse powder component f-2 to be used in the present invention may be further added with alcohol, which evaporates from the product and acts as a disinfectant against aerophilic and aerophobic germs. In such a case, the alcohol to be added is preferred to be ethyl alcohol in consideration of its safety to human bodies and its disinfecting power. Further, an antifreezing solution like ethylene glycol or propyrene glycol may be added to permit use of the disoxidant at temperatures below 0° C.

In the present invention, the fine metallic powder M (disoxidant component) is admixed with the mixture F (disoxidation reaction control component) the water content of which is controlled to 20-90% of the amount of saturated water absorption of the mixture. In this instance, there is no need for employing a special mixing machine for mixing them. For charging into the packaging paper, the filler mixture F and fine metal powder M are simply dropped into the packaging paper by gravity or after once charging them in a container of circular or polygonal cylinder. In a case where the filler mixture F and fine metal powder M are charged into the packaging paper by dropping them in this manner, the fine metallic powder which has a greater specific gravity produces an impact force upon charging by its own weight and dispersed into the filler F. Especially in the case of the present invention employing the fine powder f-1 which has a particle size substantially same as that of the fine metallic powder M, there is no possibility of the film metallic powder being separated from the filler powder. In a case where it is desired to mix the metal component M and filler F more uniformly with each other, there may be used a wire mesh or net for shifting and dispersing the metal powder to be dropped on the filler F.

With regard to the proportions of the fine metallic powder M and filler mixture F, it is recommended that the volume ratio of the former to the latter, M/F, is in the range of $\frac{1}{2}-1/10$, preferably in the range of $\frac{1}{4}-\frac{1}{8}$. If the volume ratio M/F is too small, it is difficult to uniformly disperse the metal component M in the filler mixture F by the impact force of the metal component M alone when dropped onto the mixture F, due to the small proportion of the mixture F. A relatively good mixture of the two components M and F can be obtained when the proportion of the mixture F is about two times as large as that of the metal powder component M, and a mixture which has the metal component substantially uniformly dispersed in the filler mixture can be obtained when the filler is blended in about four times as great an amount. There is no special technical effect even if the filler mixture F is used in an amount more than ten times greater than that of the metal component, so that it is disadvantageous from the standpoint of cost. In a case where the water content of the mixture F is smaller than 60% of its saturated water absorption, it is advisable to have a volume ratio M/F smaller than $\frac{1}{4}$ in order to obtain a product of high disoxidation activity.

In the present invention, it is preferred that the metal component M has as small a grain size as possible for producing a disoxidant with enhanced reactivity, but practically there is no problem as long as it has a particle size smaller than 100 mesh.

BEST MODE FOR CARRYING OUT THE INVENTION

The present invention is illustrated more particularly by the following examples, but it is to be understood that the present invention is not limited to the particular forms shown therein.

EXAMPLE 1

(1) Disoxidation Component M

For the disoxidation component M, reduced iron powder of the following particle size distribution and with an apparent specific gravity of 3.0 g/cm was used as it was.

| mesh | wt % |
|---|---|
| 100–140 | 0 |
| 140–200 | 2.9 |
| 200–250 | 8.4 |
| 250–325 | 25.4 |
| 325– | 63.3 |

(2) Disoxidation Reaction Control Component F

With regard to the disoxidation control component F, the following two kinds of powdery zeolite (approximate water content: 8 wt%) were used as starting material.

Fine porous powder f-1:
  True specific gravity: 2.3
  Bulk specific gravity: 0.5
  Particle size distribution:
    100 mesh pass, more than 90 wt%
    300 mesh pass, 65 wt%
Coarse porous powder f-2:
  True specific gravity: 2.3
  Bulk specific gravity: 0.7
  Particle size distribution:
    30-15 mesh, 93 wt%

After adding a suitable amount of an aqueous NaCl solution of a concentration of 6 wt% to the coarse zeolite powder f-2, the fine zeolite powder f-1 is admixed thereto to obtain a disoxidation reaction control component F with a volume ratio (f-1)/(f-2) of 4/6. In so doing, the amount of additive water to the coarse zeolite powder f-2 was adjusted such that the mean water content in the total mixture was 20 wt% [42% of saturated water absorption (48 wt%)].

The resulting mixture was sealed in an air-impermeable polyethylene bag and left to stand at room temperature for 1 week to shift the water content from f-2 to f-1, followed by the tests as described below.

(3) Charging Components M and F

After charging the component F into an air-permeable packaging bag through upper open end thereof, the component M is charged and dispersed by dropping same from a distance of about 30 cm. In this instance, the charging amount of the component M was maintained constantly at 0.5 cm³, while the proportion of the component F was varied in various ways.

(4) Disoxidation Reaction Test

The packages of various disoxidants which were obtained in the above-described manner were respectively sealed in polyethylene bags having an inner volume controlled at 1000 cc. The oxygen concentrations in the sealed polyethylene bags containing the disoxidant packages were measured at predetermined time intervals to check the disoxidation power of the respective disoxidants.

(5) Fluidity Test of Zeolite Powder Mixture F

Zeolite powder mixtures F of various volume ratios in (f-1)/(f-2) were charged under pressure in stainless steel measuring containers (cylindrical containers of 18.1 mm in diameter and 10.0 mm in depth), and then the containers were tilted to observe outflows of the contents of the containers. In this instance, the powder mixture of good fluidity which flowed out of the container without depositing on the container walls was rated as "good", and the powder mixture which partly deposited on the container wall and showed a difficulty in flowing out of the container was rates as "inferior".

The results of the disoxidation reaction test are shown in Table 1. As seen from the test results of Table 1, the disoxidation activity is lowered with a higher M/F ratio. The drop in the disoxidation activity is considered to be attributable to a reduction of contact area between the metal component M and filler component F and also to a reduction in the water content relative to the metal component M.

Nextly, the fluidity of the filler F was tested in relation with the proportions of the fine powder component f-1 and coarse powder component f-2 in the filler F by the same testing procedures as mentioned hereinbefore. As a result, it was confirmed that the fluidity of the filler F is deteriorated with a greater value in the ratio (f-1)/(f-2), part of the fine powder component f-1 depositing on the container walls when the ratio (f-1)/(f-2) exceeded 7/3, exhibiting "inferior" fluidity.

TABLE 1

| Experiment | Disoxidant Composition (cm³) | | | | Removed Oxygen (cm³) Time (hr) | | |
|---|---|---|---|---|---|---|---|
| | | F | | | | | |
| No. | M | f-1 | f-2 | M/F | 6 | 12 | 24 |
| 1 | 0.5 | 1 | 1.5 | 1/5 | 125 | 191 | 243 |
| 2 | 0.5 | 0.8 | 1.2 | ½ | 121 | 153 | 173 |
| 3 | 0.5 | 0.6 | 0.9 | ½ | 94 | 107 | 110 |
| 4 | 0.5 | 0.4 | 0.6 | ½ | 65 | 73 | 80 |
| 5 | 0.5 | 0.2 | 0.3 | 1/1 | 27 | 32 | 38 |

EXAMPLE 2

In the same manner as in Example 1, disoxidants were prepared using different kinds of filler, followed by the same disoxidation reaction test as in Example 1. The results are shown in Table 2.

The iron powder and zeolite used in this Example were of the same kind as in Example 1, and the coarse activated carbon was of a cylindrical shape with dimensions of 0.4 mm × 0.6 mm while the fine activated carbon had a particle size of about 300–350 mesh. The average water content in the filler F was 25% by weight.

The respective symbols used in Table have the following meanings.

Z-1: fine zeolite powder
Z-2: coarse zeolite particles
C-1: fine activated carbon powder
C-2: coarse activated carbon particles
Z.C-1: equivalent mixture of fine zeolite and activated carbon powder

TABLE 2

| Experiment | Disoxidant Composition (cm³) | | | | Removed Oxygen (cm³) Time (hr) | | |
|---|---|---|---|---|---|---|---|
| | | F | | | | | |
| No. | M | f-1 | f-2 | M/F | 6 | 12 | 24 |
| 1 | 0.5 | Z 1:1 | Z 2:1.5 | 1/5 | 140 | 206 | 264 |
| 2 | 0.5 | Z 1:1 | C 2:1.5 | 1/5 | 90 | 113 | 129 |
| 3 | 0.5 | C 1:1 | Z 2:1.5 | 1/5 | 176 | 234 | 306 |

TABLE 2-continued

| Experiment | Disoxidant Composition (cm³) | | | | Removed Oxygen (cm³) Time (hr) | | |
|---|---|---|---|---|---|---|---|
| | | F | | | | | |
| No. | M | f-1 | f-2 | M/F | 6 | 12 | 24 |
| 4 | 0.5 | C 1:1 | C 2:1.5 | 1/5 | 169 | 186 | 248 |
| 5 | 0.5 | Z.C 1:1.5 | Z 2:1.5 | 1/6 | 133 | 219 | 305 |

INDUSTRIAL APPLICABILITY

According to the process of the present invention, it is possible to obtain a disoxidant of extremely enhanced disoxidation activity, having a metal component M substantially uniformly dispersed in a filler mixture simply by mechanical charging operation without requiring any special mixing efforts. Since the proportions and particle sizes of the respective components as well as the water content of the disoxidant are restricted to particular ranges, there occurs no trouble in particular in the charging operation, and high-speed production is possible.

We claim:

1. A disoxidant in the form of a mixture of a disoxidation component M consisting of fine metallic powder of a particle size not greater than 100 mesh and a disoxidation reaction control component F consisting of 20–60% by volume of fine powder of a porous filler f-1 of a particle size not greater than 100 mesh and 80–40% by volume of coarse powder f-2 of a particle size greater than 100 mesh and having a total weight content controlled in the range of 20–90% based on the amount of saturated water absorption thereof and a volume ratio M/F of said disoxidation component M to said disoxidation reaction control component F in the range of ½–1/10.

2. A disoxidant as set forth in claim 1, wherein said disoxidation component M is fine metal powder.

3. A disoxidant as set forth in claim 1, wherein said disoxidation component M is fine metal powder with activated surfaces by reaction with an acidic aqueous solution.

4. A disoxidant as set forth in claim 1, wherein said disoxidation component M is fine metal powder with an oxidation layer on the surface thereof.

5. A disoxidant as set forth in claims 2, 3 or 4, wherein said fine metal powder is iron.

6. A disoxidant as set forth in claim 1, wherein said fine powder of porous filler f-1 contains an electrolyte in addition to water.

7. A process for preparing a disoxidant, comprising: providing fine powder of a porous filler f-1 of a particle size not greater than 100 mesh and coarse powder of a porous filler f-2 of a particle size greater than 100 mesh; adding water to said coarse powder f-2 such that the total water content for the sum of said fine and coarse powder f-1 and f-2 is 20–90% of the amount of saturated water absorption thereof; mixing 20–60% by volume of said fine powder f-1 with 80–40% by volume of said coarse powder f-2; and admixing the resulting mixture F with fine metallic powder M having disoxidation activity and a particle size not greater than 100 mesh, with a ratio of volume M/F of the component M to F being in the range of ½ to 1/10.

8. A process as set forth in claim 7, wherein the additive water contains an electrolyte.

* * * * *